S. C. MAINE.
Ventilators.
No. 5,363. Reissued April 22, 1873.
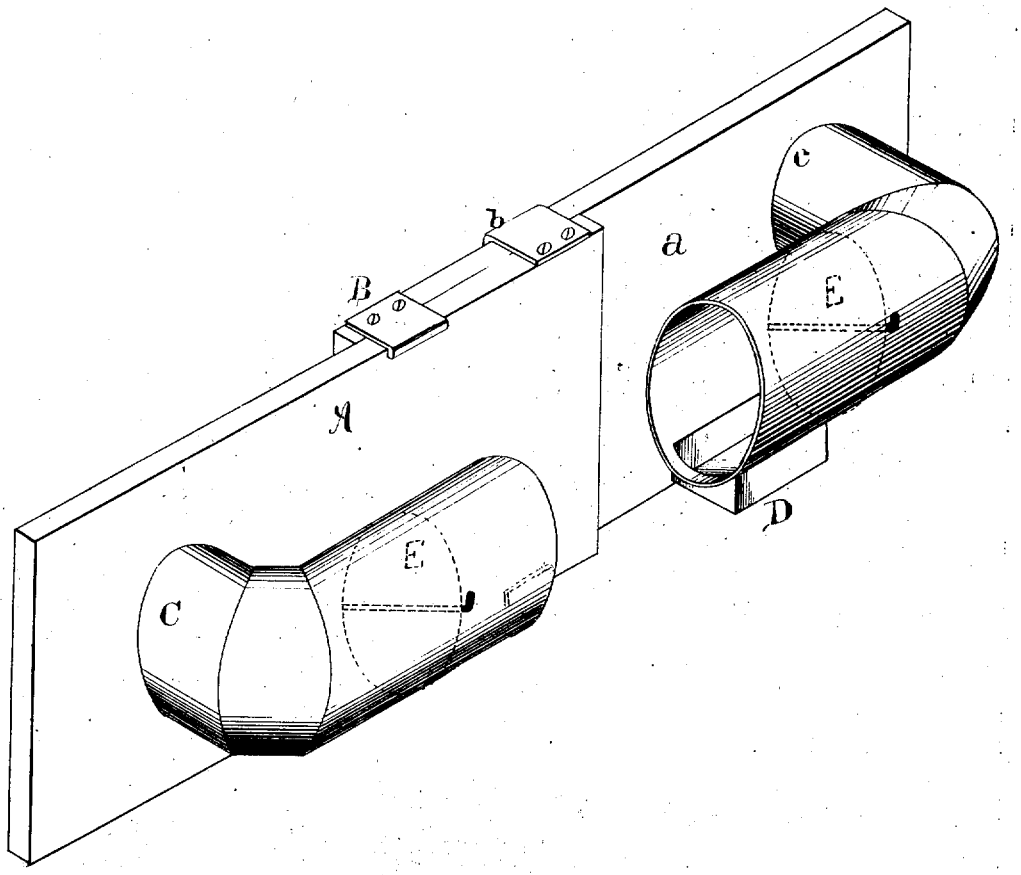
Attest.
Philip M. Shuey
J. M. Bonnell
Inventor
Sebreus C. Maine
per Fisher & Duncan
Attys.

UNITED STATES PATENT OFFICE.

SEBEUS C. MAINE, OF BOSTON, MASSACHUSETTS, ASSIGNOR, BY MESNE ASSIGNMENTS, TO MAINE'S PORTABLE VENTILATOR COMPANY.

IMPROVEMENT IN VENTILATORS.

Specification forming part of Letters Patent No. 100,429, dated March 1, 1870; reissue No. 5,363, dated April 22, 1873; application filed October 29, 1872.

*To all whom it may concern:*

Be it known that I, SEBEUS C. MAINE, of Boston, in the county of Suffolk and Commonwealth of Massachusetts, have invented a new and Improved Ventilator; and I hereby declare that the following is a full, clear, and exact description thereof, reference being had to the accompanying drawing and to the letters of reference marked thereon.

My invention has for its object to provide for apartments of every kind a means of ventilation that shall be simple and economical in its construction, and, at the same time, efficient in its operation; and its principal feature consists in so constructing the ventilator that the currents of fresh air will be deflected from a direct course on entering the apartment to be ventilated, and thrown in substantially a vertical direction, so as to impinge upon the ceiling of the room above the ventilator. It also consists in providing the ventilator with an adjustable frame, by means of which it may be fitted to any window in which it may be desired to use it.

I also propose, when desired, to provide my ventilator with a cup, pan, or other equivalent receptacle for containing a disinfectant or any other substance with which it may be desired to impregnate the air as it passes in through the ventilator, though I am aware that this, in itself considered, is not novel.

For the purpose of deflecting the currents of air from their direct course, I make use of a rounded pipe-elbow, the two arms of the same being turned substantially at right angles to each other—one arm of this elbow being inserted in the orifice that communicates between the apartment and the air outside, and, being cylindrical in form, it can readily be turned in its frame or setting and adjusted at any required angle, so that the inner end of the pipe may be directed upward toward the ceiling, or downward toward the floor, or toward any other desired point. For the ordinary purposes of ventilation it will be made to occupy a vertical position, being turned directly upward. When it is turned in this direction, the cool air, as it is introduced, is projected upon the ceiling, being there diffused radially over the entire room, and gradually settling down from its own gravity, and mingling with the vitiated air equally in all parts of the apartment. If turned downward, the air will first be brought in contact with the floor, spreading itself out over the entire surface, and gradually rising as it becomes expanded under the higher temperature of the apartment.

It will readily be seen that the great advantage of this mode of ventilation consists in the fact that, while an abundant supply of fresh air is at all times insured to the occupants of the room, yet they are entirely free from the injurious effects arising from exposure to either the direct or indirect drafts or currents that characterize other systems of ventilation in which there is direct communication through the windows or walls of an apartment with the external air. A person may sit close to one of my improved ventilators, when a strong current of air is passing in through it, and the air of the room is being rapidly changed, without feeling the slightest draft.

I am aware that it is no new invention to change the direction of the currents of air on entering an apartment to be ventilated. This has been done by the use of a screen or shield placed directly in front of the opening which communicates with the external air; but such appliances have been intended simply to protect the person sitting in front of them from the direct draft, and they have not, to my knowledge, been so constructed as to throw the entire body of fresh air admitted, in an unbroken column, upward in a vertical direction. Being uninclosed at the ends, and sometimes at the bottom, they would permit the air to flow out laterally and downward as well as in an upward direction, and, for this reason, would be but poorly adapted for apartments used for public assemblies.

I am also aware that ventilators have been used which give the air an inclined upward direction. The radical difference between such devices and my invention consists in the fact that all such ventilators throw the column of air upon the ceiling at such an angle that it is reflected therefrom and descends upon the heads of the persons occupying the room. My ventilator, on the other hand, causes the column of air to impinge upon the ceiling in such a way that it is immediately broken and dispersed, mingling with the air of the room near the ceiling, and gradually settling down of its own gravity. For the purpose of regulating the flow of air through the ventilating-tube, I place a damper in one arm of it so constructed that it may entirely close the passage or open it to its fullest capacity, or occupy any intermediate position.

In adapting my ventilator to ordinary house-windows I usually prefer to employ two tubes or elbows; and, that the ventilator may be serviceable in windows of different widths, I construct the frame of two sections of the requisite width, to be placed beneath the raised sash, inserting one tube in each section; and these sections I make adjustable by means of hinges, slides, or in any like manner, so as to admit of their being extended, folded, or contracted so as accurately to fill the space between the two sides of the window-frame. A convenient method of effecting this adjustability is to secure clasps to the edges of the sections, as shown in the drawing. These clasps hold the sections together, but at the same time allow them to slide upon each other; and thus they may be extended or drawn out to the width of any ordinary window. These sections of the ventilator-frame I ordinarily make of boards; but manifestly my invention is in no way concerned with the particular kind of material used for this purpose. In my portable window-ventilator I usually make the sections about two feet long, about eight inches wide, and about one-half an inch thick. On one side of the inner end of my ventilator-tube the metal may be indented or depressed so as to form a cup for receiving any disinfectant or other substance with which it is sought to impregnate the air of the room. By turning the tube down into a horizontal position this cup will be brought into a position to hold liquids. The disinfectant or deodorizer is now placed in the cup, and, by opening the damper and admitting a current of air to pass over the cup, the liquid is evaporated and the vapor distributed to all parts of the room. To hasten evaporation and to prevent spilling of the liquid a sponge may be placed in the cup. Instead of a cup formed in the sid of the tube, as above described, a small pan may be used, which is to be placed in the tube and removed at pleasure, or the cup may be attached to the outside of the tube.

Referring to the accompanying drawing, in which there is shown a perspective view of the entire apparatus constituting one of my portable and adjustable window-ventilators, A and *a* are the two sections of the frame. B and *b* are the clasps between which the sections are held so as to slide upon each other. C and *c* are the tubes through which the air passes. D is a cup formed in the side of one of the ends of the tube, and E is a damper in one of the tubes.

Not only does this ventilator supply fresh air to a room, and in such a way as not to subject the occupants to any draft, but, if placed in a close apartment with no outlet but itself, it will work alternately in both directions, now filling the apartment with pure air and then carrying off the mixed and vitiated air.

Having thus fully described my invention, what I claim as new, and desire to have protected by Letters Patent of the United States, is—

1. A ventilator of the character hereinbefore described, whereby the currents of air are deflected from a direct course on entering the apartment to be ventilated, and are thrown upward in a vertical direction, substantially as and for the purpose set forth.

2. A ventilator provided with an adjustable frame, substantially as and for the purpose described.

3. The combination in a ventilator of an adjustable frame, an air pipe or pipes, and a damper or dampers for regulating the supply of air, substantially as described.

SEBEUS COLVER MAINE.

Witnesses:

CARROLL D. WRIGHT,

JESSE F. WHEELER.